O. C. HOUGHTON.
TRACTION ENGINE.
APPLICATION FILED JAN. 8, 1915.
1,229,462.
Patented June 12, 1917.
5 SHEETS—SHEET 5.
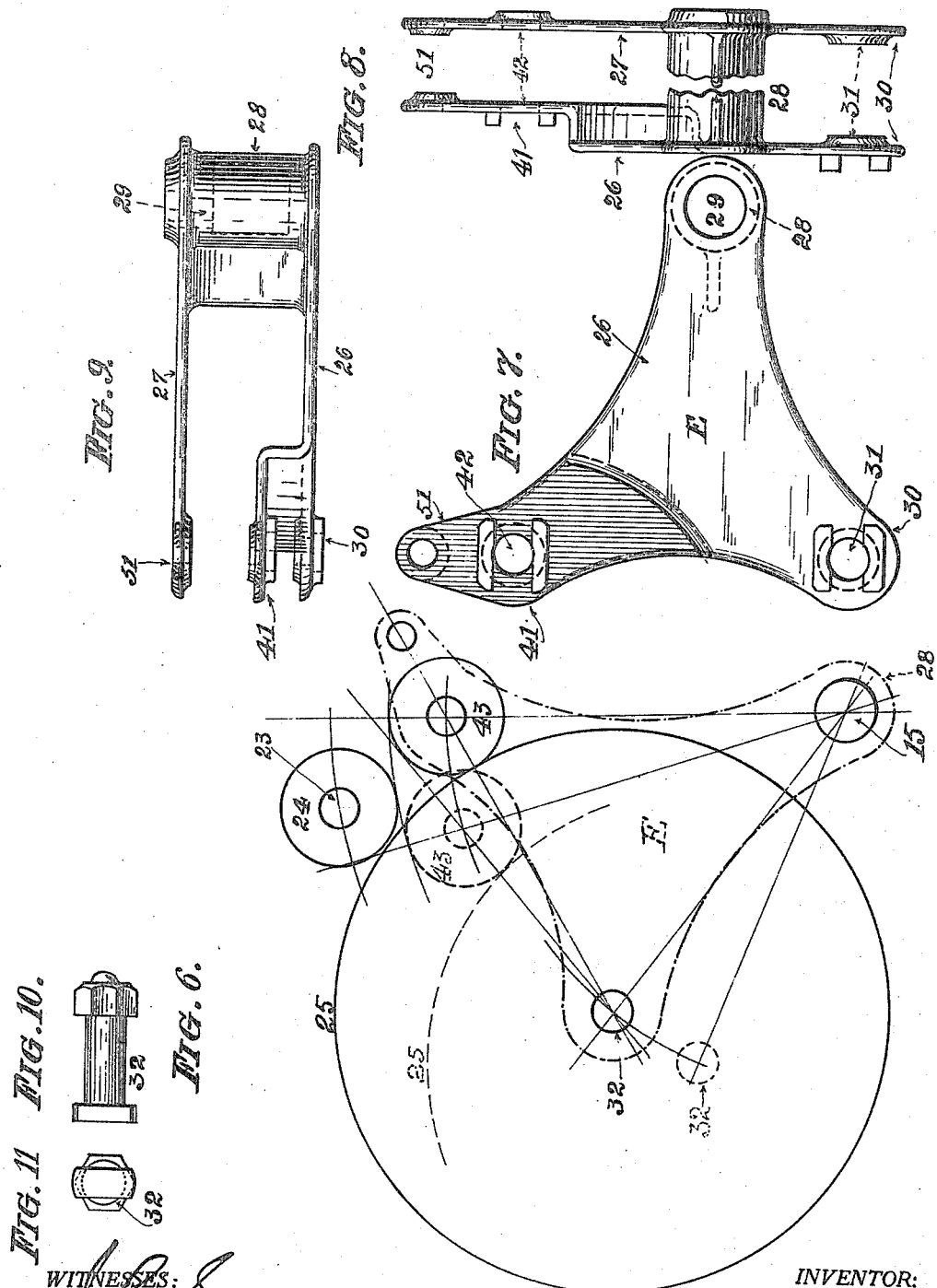
WITNESSES:
INVENTOR:
ORLEY C. HOUGHTON,
BY
ATTORNEYS.

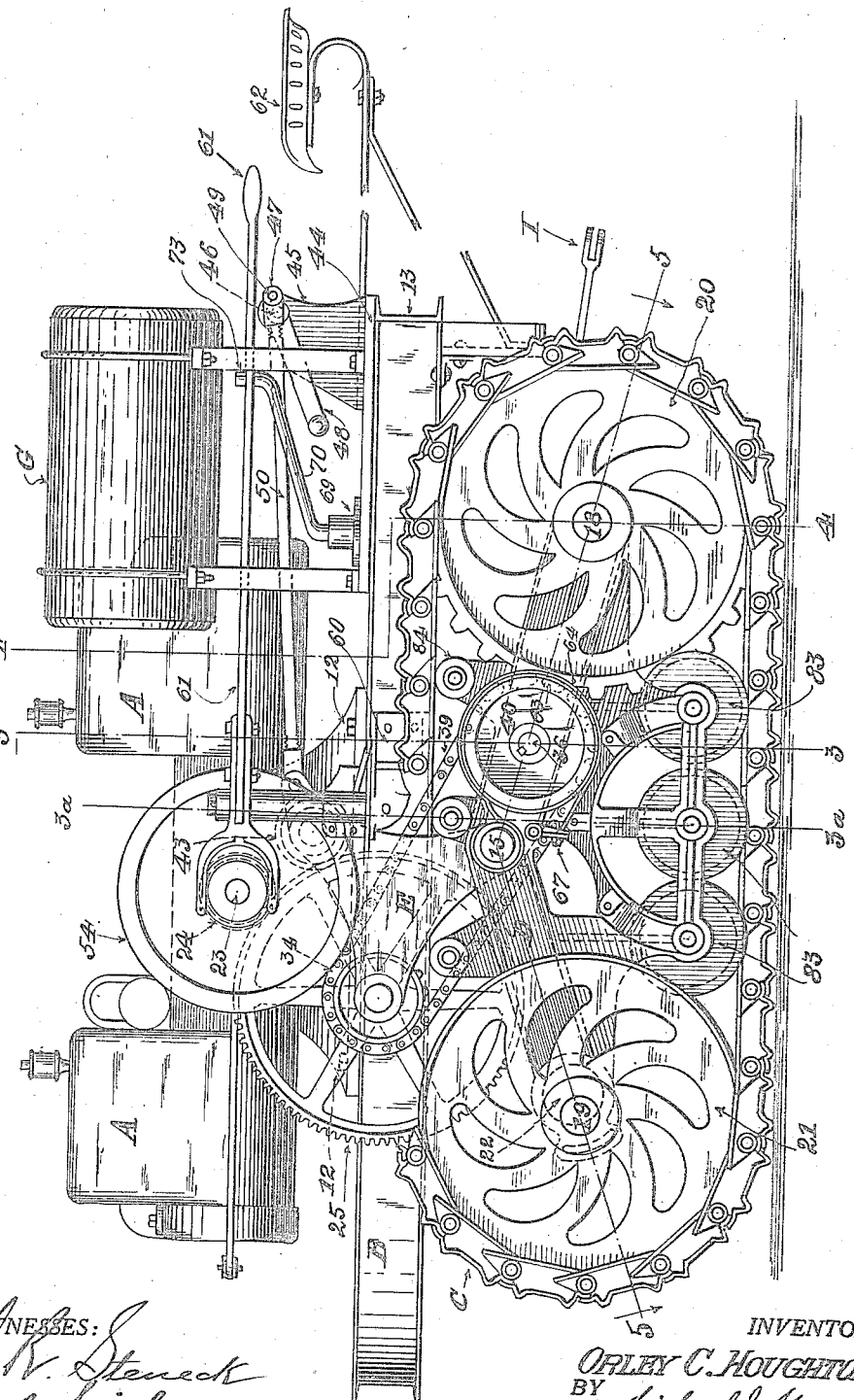

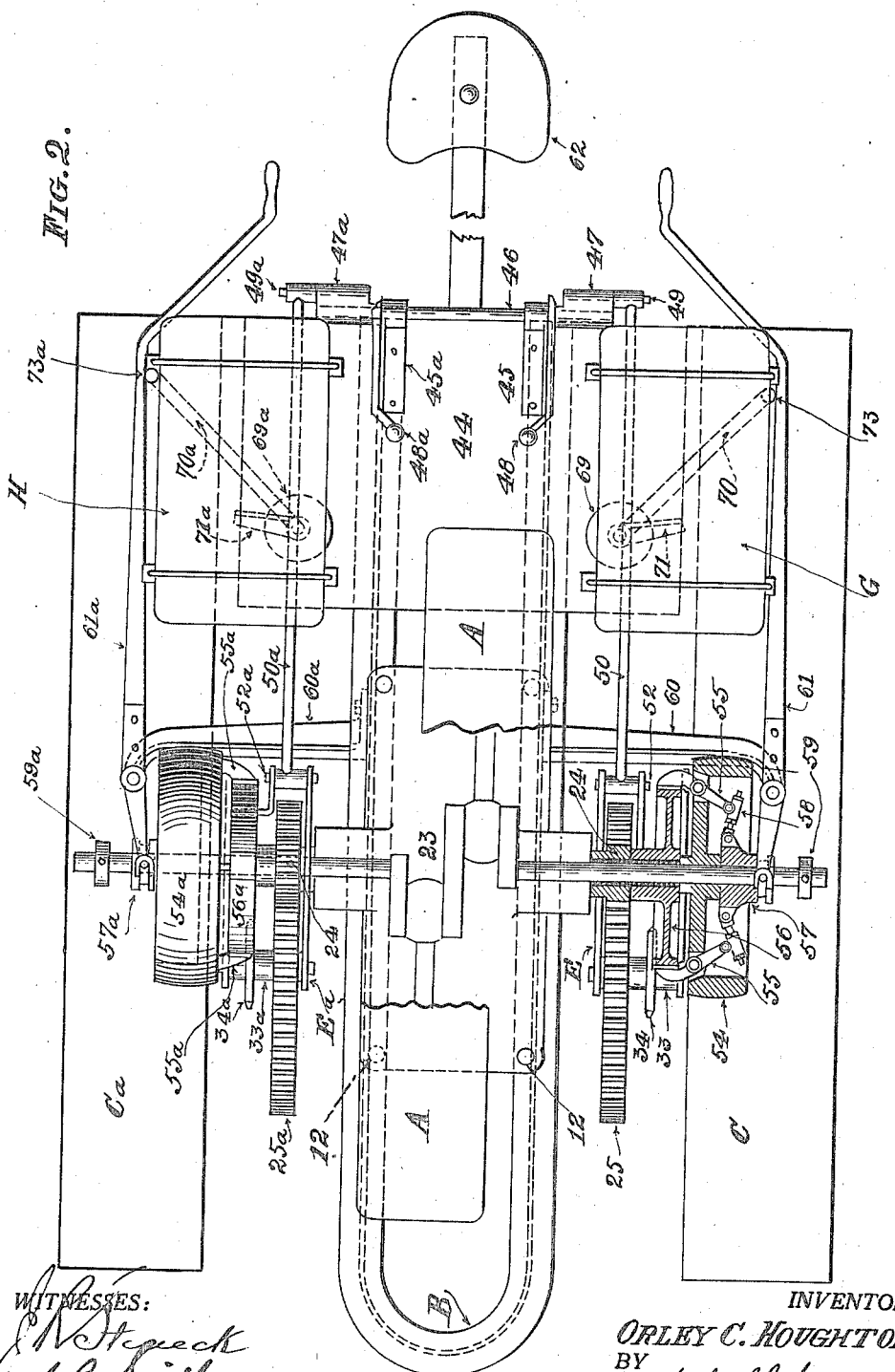

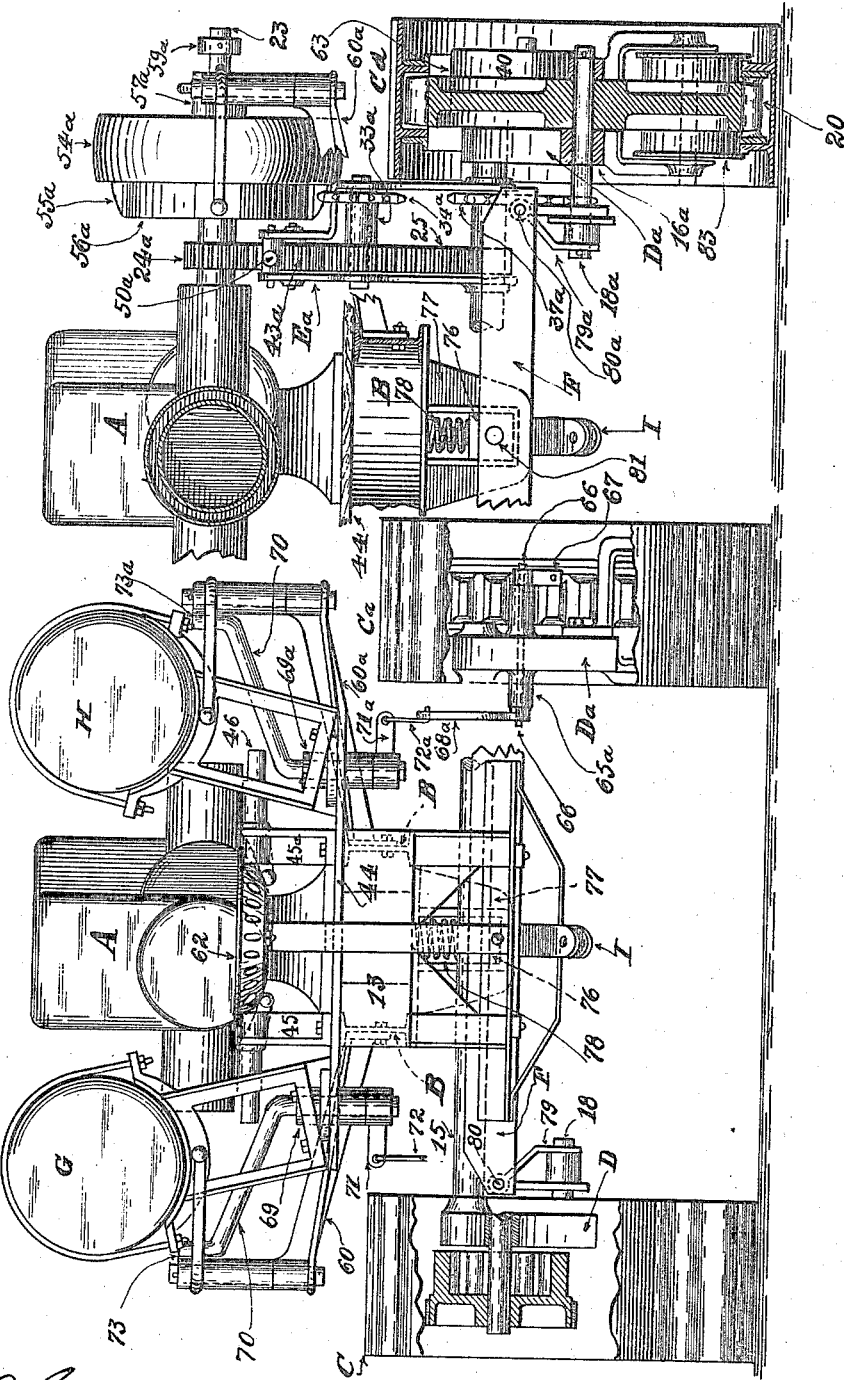

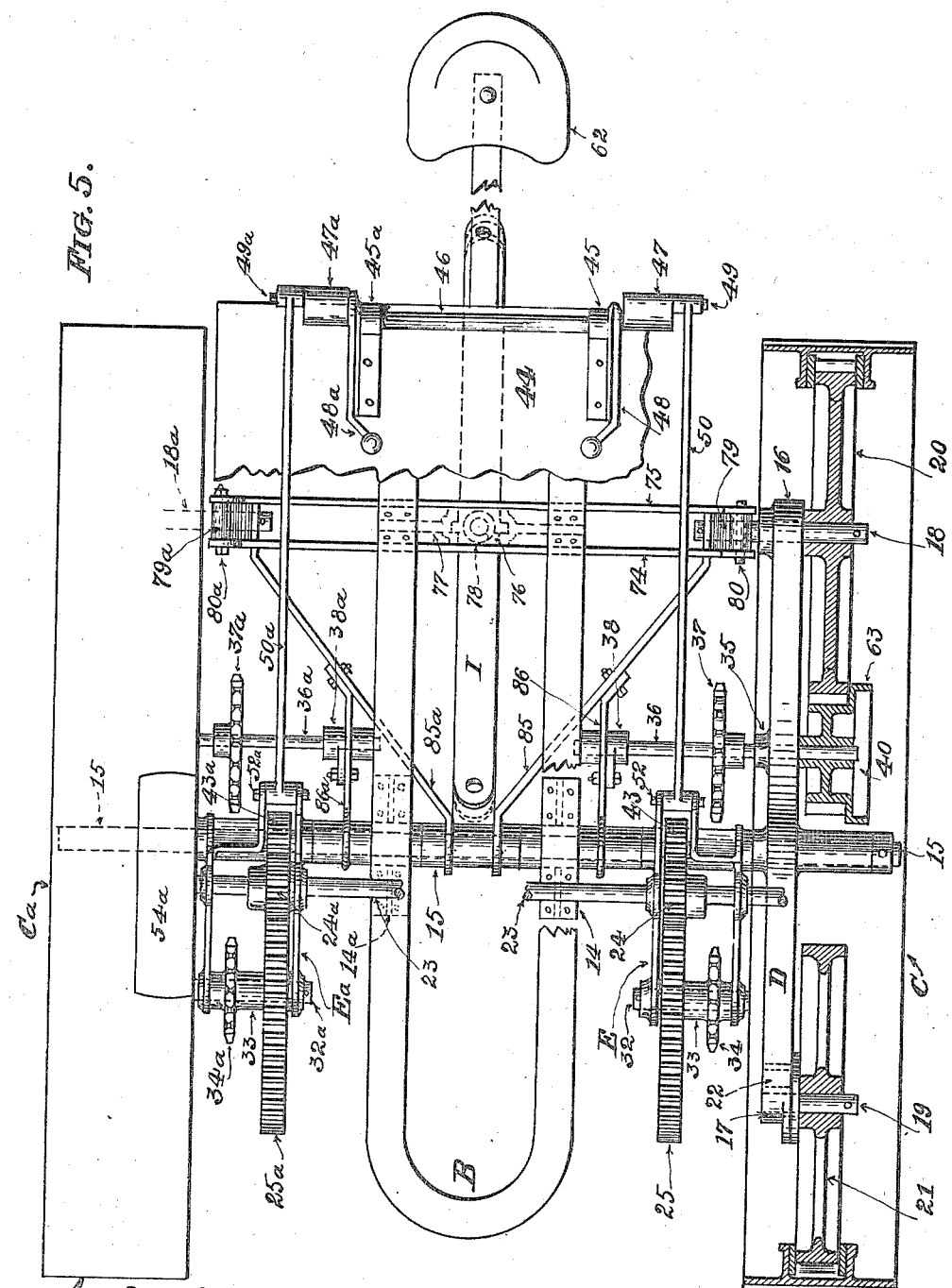

UNITED STATES PATENT OFFICE.

ORLEY C. HOUGHTON, OF CHICAGO, ILLINOIS, ASSIGNOR TO BULLOCK TRACTOR COMPANY, OF CHICAGO, ILLINOIS, A CORPORATION OF ILLINOIS.

TRACTION-ENGINE.

1,229,462.  Specification of Letters Patent.  Patented June 12, 1917.

Application filed January 8, 1915. Serial No. 1,205.

*To all whom it may concern:*

Be it known that I, ORLEY C. HOUGHTON, a citizen of the United States, and resident of Chicago, in the county of Cook and State of Illinois, have invented certain new and useful Improvements in Traction-Engines; and I do hereby declare that the following description of my said invention, taken in connection with the accompanying sheets of drawings, forms a full, clear, and exact specification, which will enable others skilled in the art to which my said invention appertains to make and use the same.

The object of this present invention is the production of an efficient, serviceable and economical traction engine of the double endless track type, which shall be capable of being steered without any other mechanism than the two endless track-bands, and which shall be able to turn in the shortest possible space. Such a machine is, at present, a desideratum, and will fill a long-felt want especially so because, being comparatively simple in construction, and built of the least number of parts, it can be manufactured and sold at a reasonable price, so as to bring it within reach of farmers that cannot afford to invest in the larger and more expensive machines now in the market. This invention, therefore, consists, essentially in the novel and peculiar combination of parts, and details of construction as hereinafter first fully set forth and described, and then pointed out in the claims.

In the drawings already referred to, which form a part of this specification and which illustrate my invention quite fully, Figure 1 is a side elevation of my improved traction engine. Fig. 2 is a plan of the same, part of the motor being broken away, and the left-hand portion of the transmission being in section, other parts which are shown in different figures being omitted. Fig. 3 is a rear-end elevation, portion of the endless-track mechanism at the left hand of said figure being in section, on line 3—3 of Fig. 1, and the right-hand track band being partly broken away to disclose portions of the truck, on line 3ª—3ª of Fig. 1. Fig. 4 is a half-rear-end elevation, the truck being in section drawn on line 4—4 of Fig. 1. Fig. 5 is a plan similar to the Fig. 2, the motor being removed and the truck being in section on line 5—5 of Fig. 1. Fig. 6 is a diagrammatic plan of the gearing by which the movement of the endless track-bands is reversed. Fig. 7 is a side-elevation of the frame in which the said gearing is mounted. Fig. 8 is an end-elevation of the same, and Fig. 9 is a plan-view thereof. Fig. 10 is a view of one of the shafts on which said gears are constructed to rotate, and Fig. 11 is an end-view of the same.

Like parts are designated by the same characters and symbols of reference in all the figures.

A in the drawings designates a motor, preferably of the opposed-cylinder, internal combustion, type, which motor is mounted on a frame-structure or chassis, B, comprising an I-beam of suitable strength formed to U-shape; said motor being bolted, by bolts 12, to the upper flanges of said I-beam. At the rear ends of this I-beam there is a transverse channel-beam 13, Fig. 1, by which the two parallel members of the frame-structure are rigidly connected.

At each side of the frame-structure A there is an endless track C, Cª, which tracks, and all parts appertaining thereto, are alike, so that, in describing but one of these endless tracks, it will be understood that the description also applies to the other, there being the suffix *a* attached to the characters of reference to differentiate one set of parts from the other set.

Pending from the I-beam or sill A and secured to the lower flanges thereof there are two hangers 14, 14ª, Fig. 5, in which there is mounted the main axle 15, which is suitably fixed in these hangers and which axle extends nearly the entire width of the machine. Near the outer ends of this axle 15 there are mounted truck-frames D, Dª, constructed substantially like the one illustrated in Figs. 36 to 40 inclusive, of the drawings appertaining to my copending application for Letters Patent, Serial No. 863,724, filed Sept. 26, 1914, and to which reference may be had for a full disclosure of the construction of said truck frame. These truck frames have at their extremities bearings, 16, 17, 16ª, in which there are secured axles 18, 19, 18ª, on which are constructed to rotate sprocket wheel 20, and idler wheel 21, the endless-track bands C, Cª, being trained over these sprocket and idler wheels, suitable provision being made to take up any slack in these track-bands, that may arise from wear, the preferred means for accomplishing this result including an eccentric mechanism 22, such as is illustrated and described in my copending application Serial No. 775,272, filed June 23, 1913.

The two endless track-bands are operated by mechanism from the crank-shaft 23 of the motor A in the following manner:

On the crank-shaft there are mounted gear pinions 24, 24ª, which mesh into spur gear wheels 25, 25ª. These spur gear wheels are mounted in frames E, Eª, one of which is shown in detail in Figs. 7 to 11 inclusive, and include two side-walls 26, 27, of substantially triangular contour. At one angle of these side-walls or plates there is a tubular boss, 28, which, by its bore 29, engages the main axle in such manner that the frame E may oscillate thereon. At the second angle, 30, of the frame E, there is a bore, 31, wherein is lodged a shaft, 32, shown in detail in Figs. 10 and 11 on which the spur gear wheel 25 rotates. Regarding this shaft I will mention that Fig. 10 does not show this shaft in correct proportions, it being longer relative to its diameter than shown, the one illustrated being intended for use in connection with a pinion hereinafter to be referred to.

The spur-wheels 25, 25ª, are formed with comparatively long hubs, 33, 33ª, on which there are secured driving sprockets 34, 34ª; or said sprockets may be formed integrally with said hubs 33, 33ª, and spur gear wheels 25, 25ª.

In the truck-frames D, Dª, there are bearings 35, Fig. 5, in which rotate shafts 36, 36ª, on which there are secured driven sprockets 37, 37ª; further bearings 38, 38ª, located near the frame structure B, being provided to support the inner ends of said shafts 36, 36ª.

A link belt, 39, Fig. 1, is trained over the sprockets 34 and 37, and 34ª and 37ª, to transmit rotative movement from the motor to the endless track-bands by means of pinions 40, secured to the outer ends of shafts 36, 36ª, which pinions mesh with the sprocket wheels 20, they being of the same pitch as that of said sprocket wheels 20.

The transmission gearing thus far described rotates or moves the endless track-bands C, Cª, in one direction, i. e., the forward movement, but in order to enable the tractor being backed up, there are at the third angle 41, of the frames E, Eª, openings, 42, for the reception of a further shaft 32, Figs. 10 and 11; it being understood that this shaft is precisely the same as the shaft 32 on which the gear wheel 25, and the sprocket wheel 34 are rotating except that the latter shaft 32 is longer; and upon these shafts there are mounted, to rotate, gear-pinions 43, 43ª, in mesh with the spur-wheels 25, 25ª. There is placed upon the frame structure B, at its rear end, a platform 44, and upon this platform there are located, in spaced relation, two standards, 45, 45ª, in which is mounted a fixed axle 46. This axle has at both of its extremities arms, 47, 47ª, which arms are formed, preferably integrally, with members, 48, 48ª, constructed to function as handles. The arms 47, 47ª, have pins or studs, 49, 49ª, serving as wrist-pins for one end of connecting rods 50, 50ª. The third angles 41 of the frames E, Eª, have extensions 51, which are perforated to receive bolts 52, 52ª, wherewith the other ends of said connecting rods 50, 50ª, engage.

As already stated, the frames E, Eª, are capable of an oscillatory movement on the dead axle 15; and in the position shown in the drawings, and in solid lines in the diagrammatic view, Fig. 6, the pinion 24 engages the spur wheel 25 for the forward movement of the tractor. But, when one of the handles 48, 48ª, at the rear end of the machine is moved or turned upward and backward to occupy a position diametrically opposed to that shown, the arm 47, or 47ª, will move the proper connecting rod 50, or 50ª, in a forward direction thereby causing the frame E or Eª to swing on its pivot (the dead axle 15) and the spur wheel 25, or 25ª, to separate from the pinion 24, or 24ª, while the pinion 43 moves into engagement with the pinion 24, and, this pinion 43, or 43ª, being always in mesh with said spur wheel, will, therefore, rotate the latter, but in a reverse direction. It will now be understood that the two sets of driving gearing that operate the endless-track bands, are entirely separate and independent of each other and that it is, therefore, possible to cause a forward movement of one of the endless-track bands, and a rearward movement, or no movement whatever, of the other endless-track band, a matter to which I shall hereinafter again refer.

In order to regulate the speed of the endless-track bands, means are provided including the following instrumentalities:

As best shown in Fig. 2, the crank shaft 23 of the motor carries fly-wheels 54, 54ª, which also function as one member of a friction clutch, inasmuch as a multiplicity of levers, 55, 55ª, Fig. 2, are pivoted in the webs of these fly-wheels which levers have shoes at one end bearing upon the periphery of a friction pulley or member 56, 56ª, loosely rotating on crank shaft 23, but integrally connected to the pinions 24, 24ª.

Slidable clutch sleeves 57, 57ª, are mounted upon and near the outer extremities of crank shaft 23, and these clutch sleeves are connected to the clutch levers, 55, 55ª, by adjustable connection links 58. Collars 59, 59ª, at the extreme ends of the crank shaft 23, prevent the clutch sleeves 57, 57a, from being laterally moved beyond a predetermined limit.

To the web of the frame-structure B, in rear of the crank shaft are secured laterally projecting brackets 60, 60a, to the upper ends of which are pivoted levers 61, 61a, the short arms of which engage the clutch-sleeves 57, 57a, while the long arms thereof extend rearwardly to within easy reach of an operator who will be seated on a seat 62, located at the extreme rear end of the tractor. By manipulating these hand levers, 61, 61a, the clutch sleeves, 57, 57a, are laterally moved on the crank shaft and this movement causes the shoes on the clutch levers 55 to engage the friction pulleys or disks 56, 56a, with greater or less force, so that these shoes of the clutch levers 55, 55a, may slide on the peripheries of the friction pulleys and thereby slacken the movement of the endless-track bands. It will now be observed that by slackening the speed of one or the other of these endless-track bands, the one having the preponderance, or excess, of speed will cause the tractor to swerve from a straight course, while if one of the track-bands is moving in a forward direction and the other track-band is caused to move in the reverse direction, the tractor is capable of turning in a circle the center of which coincides with the center of the machine. This feature of my present invention is of great importance because it enables the tractor being turned around the sharpest corners and in the most limited space; and that by a proper manipulation of the two hand-levers 61, 61a, the machine is being steered entirely by the varying speed of the endless-track bands, to the exclusion of all other steering devices which are all more or less liable to derangement and add to the cost of the machine, a drawback which it is my object to overcome as far as possible. This manipulation of the hand-levers 61, 61a, is rapidly acquired by any intelligent person.

In a tractor of the nature described, it is desirable that the speed of the machine may be checked more or less suddenly. In order to accomplish this object without adding any manipulating levers or devices for checking this speed, I accomplish the desired result in the following manner:

The gear pinions 40, 40a, are provided with brake-rims 63, Figs. 1, 4, and 5, on which there are located brake shoes or bands 64, Fig. 1. Adjacent to the bearings of the truck-frames D, Da, that engage the main or dead axle 15, there is a bearing 65a, Fig. 3, in which is journaled a shaft 66, having at its outer end a downwardly pending arm 67, Fig. 1, and at its inner end a curved, upwardly projecting, member 68a, Fig. 3, the former arms being connected to one end of the brake shoe or band 64, the other end of said band being hitched to the dead axle 15, as clearly illustrated in Fig. 1. Near the rear end of the tractor, and located upon the platform 44 there are upstanding bearings 69, 69a, which have downwardly extending portions as shown, and in these bearings there are journaled cranked shafts 70, 70a, which have at their lower ends arms 71, 71a, to which rods 72, 72a, are attached at one end, the other ends of said rods being connected to the upstanding arms 68a. The vertical members 73, 73a, of the cranked shafts 70, 70a, bear against the inner edges of the hand-levers 61, 61a, in such manner that when these hand-levers are moved to release the clutch mechanism of the driving gearing, these will move the cranked shafts and tension the brake-bands 64 and thus automatically retard or arrest the movement or momentum of the parts in motion. It will thus be seen that the stopping, the starting, the steering, and the braking of the machine are all accomplished by actuating the two hand-levers 61, 61a, thereby greatly facilitating the manipulation or handling of this machine.

A tractor of the type described is subject to being used on rather rough roads and in places where the endless-track bands will have to pass over obstructions at one side or the other of the machine. In order to allow these track-bands to ride over such obstructions without causing torsional strain in the machine, I provide, preferably at the rear end of the machine, a bolster F, Figs. 3 and 4, which bolster comprises two bars, 74, 75, Figs. 5, in parallel spaced relation. These two bars are medially connected to a box 76, Figs. 3, 4 and 5, which box is vertically slidable in a downwardly projecting bracket 77, secured to the lower flanges of the parallel members of the frame structure B; a spiral spring, 78, Figs. 3 and 4, acting on said box 76 to keep said box normally depressed. At the outer extremities of the bars 74, 75, there are placed downwardly extending supports 79, 79a, the upper ends of which are located between the plates, 74, 75, and pivoted thereto by bolts 80, 80a, while their lower ends engage the inwardly projecting portions of the axles 18, 18a, on which the sprocket wheels 20 rotate. This bolster F is made to oscillate on a pivot 81, projecting from the box 76, so that should one of the traction bands pass over an obstruction and thus rise in a vertical plane, the bolster F will oscillate on its pivot 81, and thereby prevent, through the intervention of said box and said spiral spring, any twisting of the frame-structure B, while, at the same time, said spring will always act as a buffer to prevent jars and jolts being communicated to the superposed parts and mechanisms.

In order to prevent sidewise or lateral movement of the oscillatable truck-frames, I brace one of the terminals of these truck frames by braces 85, 85ª, Fig. 5. These braces extend from the middle of the dead axle 15, preferably rearwardly, to the inner extremities of the sprocket-wheel axles 18, 18ª, the connections of the braces with said dead axle being a flexible one so that they may move vertically with the trucks when they pass over obstructions in the road. And in this connection I may mention that the bearings 38, 38ª, at the inner ends of the brake shafts 36, 36ª, are secured to rods 86, 86ª, one end of which is movably connected to the dead axle 15, and the other end secured to the brace-rods 85, 85ª, thereby permitting the brake-shafts to move in a vertical plane coincident with the vertical movement of the truck frame.

As heretofore described, the cranked shafts 70, 70ª, of the brake-operating mechanisms are moved by the hand-lever 61, 61ª, but in one direction only, i. e., to tension the brake bands or tighten them around the brake-rims 63. The tension of these bands is such that they will expand when released and thereby return the cranked shafts to their normal position.

It is obvious that this tractor will be supplied with all the necessary appurtenants for operating the machine, such as fuel-tank G, water-tank H, draw-bar I, their connections, etc., some of which are not shown for the reason that they are all of the usual standard and approved construction and form no part of my present invention.

Attention is now called to the fact that the brake-band 64 is normally loose on the brake-rim 63 so that a certain amount of movement of the actuating lever 67 is required before the said brake-band becomes effective, while as soon as one or the other of the handle-bars 61, 61ª, is manipulated, the friction clutch on the main shaft 23, governed by its respective handle-bar becomes active to begin to release said friction clutch. It follows that the brake does not become operative until a slackening of the movement of the truck band has taken place, so that the brake will not be effective when only a partial reduction of the speed of the track band is desired which, if otherwise would impose an undue load on the motor without producing practical results.

I have heretofore described with considerable minuteness, and in the drawings I have illustrated in detail, the preferred embodiment of my invention, but I desire it to be distinctly understood that many changes and alterations may be made in these parts without departing from the scope of my invention.

It is, furthermore, obvious that some of the mechanisms hereinbefore described are capable of employment in traction engines of a type, other than the endless, self-laying track construction, without change or modification.

Having thus fully described my invention I claim as new and desire to secure to me by Letters Patent of the United States—

1. In a traction engine, the combination, of a chassis, a motor mounted on said chassis, said motor having an operating shaft transversely of said chassis, a truck on each side of said chassis, an endless-track band on said truck, and means for operating said endless-track bands, said latter means including a friction driving member affixed to said transverse shaft, a second, friction driven, member mounted loosely on said transverse shaft, means constructed to operatively connect said friction-driving member to said friction driven member, a gear pinion fixedly connected to said friction driven member, a triangular frame pivotally connected at one of its angles to said chassis, a spur-gear wheel mounted at the second angle of said triangular frame, a sprocket-wheel fixedly connected to said spur-gear wheel, a driving belt connecting said sprocket-wheel to said endless-track bands, means for connecting and disconnecting said friction driving and driven members, a gear pinion mounted at the third angle of said frame, and means constructed to rock said frame to disengage said spur-gear wheel from the first mentioned gear pinion and to engage said second gear pinion with said first mentioned gear pinion.

2. In a traction engine, the combination, of a chassis, a motor mounted on said chassis, a truck at each side of said chassis, an endless-track band on said truck, mechanism in said truck constructed to move said endless-track, and mechanism constructed to operate said latter mechanism, including a main driving shaft, friction clutch mechanism on said driving shaft, a gear pinion operatively connected to said friction clutch mechanism, a triangular frame, said frame being pivotally connected to said chassis at one of its angles, a spur-gear wheel rotatably mounted in said triangular frame at its second angle, a driving member fixedly connected to said spur-gear wheel, a second gear pinion mounted in said triangular frame at its third angle, said latter pinion being constantly in mesh with said spur-gear wheel, and means constructed to oscillate said triangular frame to disengage said spur-gear wheel from the first-mentioned gear pinion and to cause engagement of the second gear-pinion with said first-named gear pinion.

3. In a traction engine, having endless-track bands on which said traction engine is constructed to move, means for reversing the direction of movement of said traction engine including a motor-driven main shaft, friction-driven mechanism on said main shaft, a gear pinion fixedly connected to said friction-driven mechanism, a substantially triangular frame pivotally mounted at one of its angles to said traction engine, a spur-gear wheel, a shaft at the second angle of said triangular frame on which said spur-gear wheel is rotatably mounted, a gear pinion fixedly connected to said spur-gear wheel, a second gear-pinion, a shaft mounted in said triangular frame at its third angle, said latter pinion being rotatably mounted on said latter shaft and constantly in mesh with said spur-gear wheel, and mechanism constructed to oscillate said triangular frame to break connection between said spur-gear wheel and the first mentioned gear pinion and to establish connection between said two gear pinions.

4. In a traction engine, the combination, with a chassis, of a motor mounted thereon, a truck at each side of said chassis, an endless-track on each truck, mechanism constructed to connect and disconnect said motor to and from said endless tracks, including rearwardly extending hand levers, brake-mechanism constructed to retard and arrest the movement of said endless tracks, and means for automatically actuating the brake-mechanism by the operation of said hand-lever, including a brake-pulley, a brake shoe on said brake-pulley, a brake shaft, an arm on said shaft connecting with said brake shoe, an upwardly extending arm on said brake-shaft, a cranked shaft, there being at the lower end of said crank shaft an arm, and a rod connecting the latter arm to the said upwardly extending arm, the terminal member of said cranked shaft being constructed to contact with said hand-lever to move the crank-shaft in one direction.

5. In a traction engine, the combination, of a chassis, a motor mounted on said chassis, a truck on each side of said chassis, an endless self-laying track-band on each truck, independent mechanism for operating said endless track-bands from said motor, including rearwardly extending handle bars, a platform at the rear end of said chassis, vertical bearings on said platform, a cranked shaft in each bearing, an arm at the lower end of each said cranked shafts, a brake-rim connected with each operating mechanism, a brake-band on said brake-rim, a brake-shaft, an arm at one end of said brake-shaft connected to said brake-band, an upstanding arm at the other end of said brake-shaft, and a rod connecting the arm on the cranked shaft to the upstanding arm on the brake-shaft, the upper end of said cranked shaft contacting with said handle bar.

6. In a traction engine, the combination, of a chassis, a motor mounted on said chassis, a truck on each side of said chassis, an endless-track band on each of said trucks, mechanism for operating said endless track-bands by said motor, and means constructed to permit one of the trucks to rise at either end without imparting torsional stress to said chassis, including a pivotally supported truck-frame in each truck, a shaft at one extremity of said truck-frame, a transversely disposed bolster, a bracket depending from said chassis, a vertically movable box in said bracket, said box having trunnions on which said bolster is constructed to oscillate, and a downwardly extending support at each extremity of said bolster, and pivotally connected thereto at one end and to said shaft at one extremity of said truck frame, at the other end.

7. In a traction engine, the combination, with a chassis, of two trucks, one on each side of said chassis and in parallel spaced relation, a dead axle transversely located below said chassis, a truck-frame, at each end of said dead axle, each truck-frame having an inwardly extending axle at one of its extremities, a bolster transversely disposed between said truck frames, a bracket depending from said chassis, said bolster being pivotally connected to said bracket, a support at each end of said bolster, said support being pivotally connected at one of its ends to said bolster and at its other end to the inwardly-extending axle, and brace-rods connected at one end to the medial portion of said dead axle and at the other end to said inwardly extending axle, whereby one or the other of said trucks may rise above the plane of the other truck without imparting torsional stress to said chassis and whereby the parallelism of the two trucks is maintained.

8. In a traction engine, an oscillatory frame structure constructed to carry a part of the transmission gearing, said frame structure comprising two, substantially triangular walls in parallel spaced relation, there being at one of the angles a tubular sleeve permanently connecting said walls at that angle, a bearing at the second angles of said walls, a non-rotating shaft in this bearing, a spur-gear wheel mounted thereon, a sprocket wheel fixedly connected to said spur-gear wheel, a bearing at the third angles of said frame structure, a non-rotating shaft in said latter bearing, a pinion rotatably mounted on the last named shaft, said pinion being in mesh with said spur-wheel, an extension at the side-walls projecting from the third-angle portion of said frame structure, and means connected to said extension constructed to oscillate said frame structure.

9. In a traction engine, the combination, with a chassis, of a traction-wheel on each side of said chassis, independent axles on which said traction wheels are rotatably mounted, and means constructed to prevent torsional stress being imparted to said chassis when one of said traction wheels rises above the plane of the other traction wheel, said latter means including a bracket depending from said chassis, a bolster, comprising two connected bars in parallel spaced relation, said bracket being located medially of, and between, said bars, a vertically movable box in said bracket, trunnions on said box constructed to engage said bars, and a supporting member at each terminal of said bolster, each said supporting member being constructed to pivotally engage the terminal of said bolster with one end, and the said independent axle at its other end.

10. In a traction engine, the combination, of a chassis, truck-frames below said chassis, an endless-track band movably mounted in each truck-frame, a motor on said chassis, and mechanism connected to said motor and said endless-track bands, each of said endless-track bands including a series of tread-plate, hermaphrodite link-members on said tread-plates, the female members of said link members being integrally connected by a tubular boss, a tubular bushing in said boss, said tubular bushing being constructed of indurate fiber, and a non-rotatable bolt in said tubular bushing constructed to pivotally connect one link-member to the adjacent link-member.

11. In a traction engine, the combination, of a chassis, a motor mounted on said chassis, said motor having an operating shaft transversely of said chassis, driving mechanism operated by said transverse shaft, two trucks, one on each side of said chassis, an endless track-band in each of said trucks, manually-operated means constructed to operatively connect each of said endless track-bands with its driving mechanism independently of the other of said track-bands, braking mechanism for each track-band connected to said driving mechanisms, and automatically operating mechanism connected with said manually-operated means constructed to apply said brake-mechanism automatically independently of each other, but only after the driving mechanism has partly been disconnected from said traction means.

12. In a traction engine, the combination, of a chassis, a motor mounted on said chassis, traction mechanism on each side of said chassis, said traction mechanism being constructed for operation by said motor independently of, or conjointly with each other, mechanism constructed to engage and disengage said traction mechanism, and said motor, and braking mechanism constructed to arrest the movement of each of said traction mechanisms, independently of the other traction mechanism, said latter mechanism being operatively connected to the mechanisms that engage and disengage said traction mechanism from said motor whereby only that one of the two braking mechanisms is automatically actuated, which is controlled by that mechanism which connects and disconnects the proper traction mechanism from said motor.

13. In a traction engine of the self-laying track type, the combination, with manually operated mechanism constructed to start and to arrest the movement of the self-laying tracks, of friction driven transmission gearing constructed to operate said self-laying tracks, braking mechanism connected to said friction driven gearing, said manually-operated mechanism including a handle-bar for each self-laying track, and means constructed to operatively connect each brake-mechanism with said handle-bar after said friction driven mechanism has initiated its operation.

In testimony that I claim the foregoing as my invention I have hereunto set my hand in the presence of two subscribing witnesses.

ORLEY C. HOUGHTON.

Witnesses:
MICHAEL J. STARK,
J. M. HEDLUND.